United States Patent [19]
Shaw

[11] Patent Number: 5,833,283
[45] Date of Patent: Nov. 10, 1998

[54] ACCESSORY MOUNTING UNIT FOR TRUCK

[75] Inventor: Jeffrey H. Shaw, Aloha, Oreg.

[73] Assignee: Freightliner Corporation, Portland, Oreg.

[21] Appl. No.: 805,471

[22] Filed: Feb. 25, 1997

[51] Int. Cl.⁶ .............................. B62D 25/16; B60R 19/04
[52] U.S. Cl. .......................... 293/117; 293/121; 293/135; 280/851
[58] Field of Search ................................... 293/117, 120, 293/121, 135, 141; 280/851

[56] References Cited

U.S. PATENT DOCUMENTS

| D. 390,521 | 2/1998 | Hellhake et al. | D12/185 |
|---|---|---|---|
| 3,999,776 | 12/1976 | Betts, Sr. | 280/851 |
| 4,333,674 | 6/1982 | Bugttner et al. | 293/120 |
| 4,541,646 | 9/1985 | Knowley | 280/851 |

OTHER PUBLICATIONS

U.S. Design Patent Application Serial No. 29/055,726 filed Apr. 25, 1996 in the names of Ferdinard Hellhake and Mark Hurayt, now US Design Patent 390,521.
Copies of photos numbered Figs. 1–3 of a faring for rear end truck disclosed at a product show on or about Oct. 27, 1995.

*Primary Examiner*—Dennis H. Pedder
*Attorney, Agent, or Firm*—Klarquist Sparkman Campbell Leigh & Whinston

[57] ABSTRACT

An accessory mounting unit for attachment to the rear end of a truck having an elongate substantially rigid mounting member which is coupled through a spring connection to a truck frame rail. Front and rear bumper shells having convex curvilinear external configurations are sealingly secured to front and rear faces of the mounting member. A depending portion of the mounting member is adapted to have a mudflap attached thereto, and apertures formed in the rear bumper shell are adapted to receive accessories such as vehicle lights.

30 Claims, 2 Drawing Sheets

ACCESSORY MOUNTING UNIT FOR TRUCK

FIELD OF THE INVENTION

The present invention relates to an accessory mounting unit for attachment to the rear end of a truck, and more particularly to an enclosed bumper housing assembly adapted to have accessories such as a mudflap and lights mounted thereon.

BACKGROUND OF THE INVENTION

Large trucks generally have a pair of elongate, longitudinally extending, laterally spaced frame rails positioned on opposite sides of the longitudinal centerline of the truck. A transverse frame member often extends between the frame rails and vehicle lights, such as tail lights and turn signals, have been mounted on the transverse frame member between the rails. This places the lights in a position which may be difficult to view from a following vehicle which is not directly behind the truck.

The wheels of the truck generally are mounted laterally outwardly from the frame rails and supports have been provided behind the wheels on which mudflaps are secured and from which they depend to be situated behind the wheels. The mudflap supports generally have not had any, or possible only minimal, aerodynamic configuration.

A previously known device included a rear bumper shell which was secured on a cantilevered mudflap support, extended laterally to one side of a frame rail, and had vehicle lights mounted therein. However, such prior device did not provide an enclosed assembly, nor did it have a convexly curved forwardly facing portion to provide an aerodynamically curved housing. In essence the prior device was merely a decorative rear shield on which to mount lights. Its forward side was merely an open concave shell and thus imposed an aerodynamic hindrance, as opposed to a benefit.

A general object of the present invention is to provide an accessory mounting unit for the rear end of a truck which includes a substantially rigid elongate mounting member adapted to be coupled at one of its ends to a truck frame rail and to extend laterally outwardly therefrom away from the truck centerline, a rear bumper shell removably attached to the mounting member, and a front bumper shell removably attached to the mounting member, with the front and rear bumper shells having a sealing interconnection therebetween to provide a substantially enclosed bumper housing with an aerodynamic configuration.

Another object of the present invention is to provide such a novel accessory mounting unit in which an elastomeric seal is provided at the interconnection between the two bumper housing shells to provide sealing engagement therebetween to inhibit the entry of dirt and moisture.

A still further object is to provide a depending portion on the mounting member to support a mudflap thereunder.

Yet another object of the invention is to provide such a novel mounting unit which has a flexible coupling interconnecting the mounting member to the frame rail, with the coupling having sufficient rigidity to support the assembly of the mounting member, bumper shells and attached mudflap at a selected cantilevered orientation during normal use, but to permit the assembly to move out of said orientation upon a preselected load being imposed thereon, and returning the assembly to the selected orientation when the load is removed.

A further object of the invention is to provide front and rear bumper shells which have convex curvilinear outer configurations to produce a combined assembly with aerodynamic front and rear configuration which provides a component enclosure.

Yet another object is to provide such a mounting unit which has recesses provided in the rear bumper shell adapted to receive and hold vehicle lights therein, with wiring and other controls therefor enclosed within the housing provided by the joined bumper shells.

The unique features of the invention, individually and in combination, will be more clearly understood and appreciated by the reference to the detailed description and accompanying drawings.

DESCRIPTION OF PREFERRED EMBODIMENT OF THE INVENTION

Figure 1:
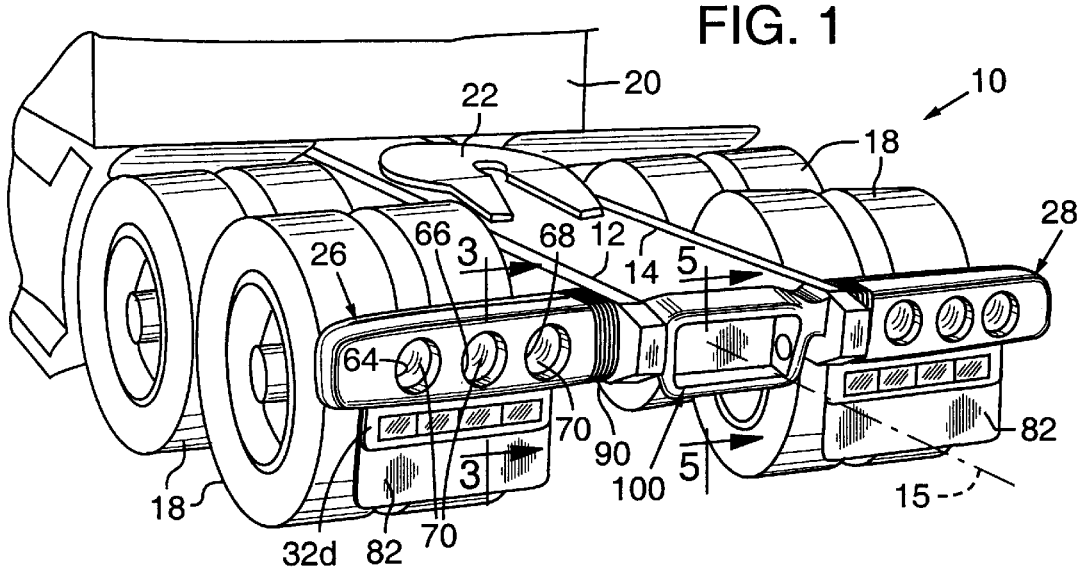
FIG. 1 is a rear perspective view of a truck tractor, or truck, with an accessory mounting unit constructed according to an embodiment of the invention mounted thereon.

Referring the drawings, and first more specifically to FIG. 1, at 10 is indicated generally a truck tractor, or truck, having a pair of elongate, laterally spaced frame rails 12, 14 extending longitudinally of the truck and spaced to opposite sides of the longitudinal centerline 15 of the truck. These frame rails provide support for the wheels 18, cab 20, and a load support unit 22. A transverse frame member, or beam, 23 shown partially in FIG. 1 and 5 extends between rails 12, 14.

Although the invention is described herein in regard to the truck tractor illustrated, it should be recognized that the invention also is adaptable for use on any kind of vehicle to which such an assembly may be advantageous, such as the rear end of the trailer portion of a truck, a trailer alone, etc.

A pair of substantially mirror-image left and right-hand accessory mounting units constructed according to an embodiment of the invention are indicated generally at 26, 28. They are secured to frame rails 12, 14, respectively, and extend laterally outwardly therefrom away from the truck centerline 15 to be positioned behind wheels 18.

Figure 2:
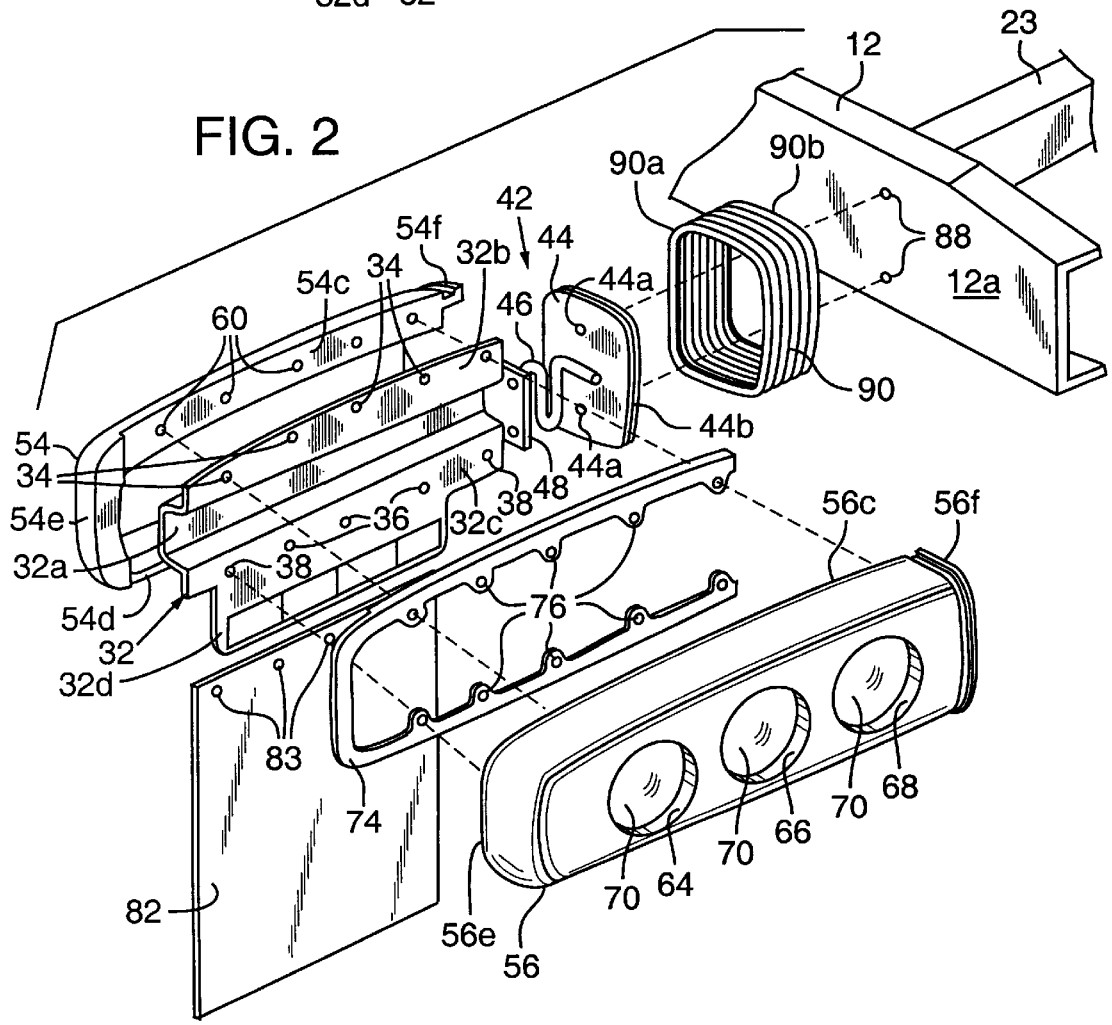
FIG. 2 is a enlarged exploded view of an accessory mounting unit and the rear end of a frame rail of the truck.

Referring to FIG. 2, and the exploded view of mounting unit 26 specifically, it includes a substantially rigid elongate mounting member 32. The mounting member has an elongate support portion formed in the shape of an elongate channel 32a with upper and lower attachment bracket portions 32b, 32c, respectively, extending upwardly and downwardly therefrom. Further, the mounting member has a substantially planar depending portion 32d extending below lower attachment bracket portion 32c, upon which a conspicuity strip with reflective material thereon is mounted. The upper attachment bracket portion 32b, has bores 34, extending therethrough. The lower bracket portion has an inner series of bores 36 aligned vertically with depending portion 32d and a pair out outer bores 38 spaced outwardly therefrom. Bores 36 can be positioned either in lower bracket portion 32c or in depending portion 32d.

The upwardly and downwardly projecting bracket portions 32b, 32c are substantially aligned in a common plane.

Channel, or support, portion 32a projects laterally from the plane of portions 32b, 32c. The channel shaped configuration of portion 32a is instrumental in providing rigidity to the mounting member to assist in supporting the mounting unit in a cantilevered position extending laterally outwardly from its associated frame rail.

Referring still to FIG. 2, a mounting assembly 42 is adapted to attach the mounting unit to frame rail 12. The mounting assembly includes a first plate bracket 44, a flexible coupling, or spring, 46, and a second plate bracket 48.

The first plate bracket 44 is disposed in a substantially upright position parallel to an upright planer side 12a of frame rail 12. A pair of bores 44a are aligned with a pair bores 88 in the frame rail, and fasteners, such as nut and bolt connectors, are used to secure bracket 44 to the side of the frame rail. Bracket 44 has a somewhat curved, or rounded rectangular perimeter edge margin 44b, which may have a circumferential groove formed therein.

The second plate bracket 48 is secured to the end of mounting member 32 which will be positioned adjacent frame rail 12. Plate bracket 48 may be secured to the mounting member either by welding or by screw or bolt connectors.

The flexible coupling, or spring, 46 shown here is a sinuous, or curvilinear, spring rod having one end portion secured, as by welding, to bracket 44 and its opposite end secured, as by welding, to bracket 48. The spring is designed to be sufficiently rigid that it will hold the mounting unit and accessories thereon in the position illustrated in FIG. 1, extending in a horizontal cantilevered position outwardly from the frame rail behind wheels 18. However, the flexible coupling permits the assembly to be pivoted, or moved, out of this orientation about either horizontal or vertical axes if a preselected load is imposed on the assembly, such as by an impact load should something hit the mounting assembly. The assembly then is returned by the spring to its preselected orientation when the load is removed. Although a sinuous spring rod is illustrated, it should be recognized that other forms of flexible connectors, such as coiled springs or other devices, may be used to provide such flexible interconnection between the mounting assembly and frame rail.

The mounting unit further includes an elongate front bumper shell 54 and elongate rear bumper shell 56. Each of these is somewhat longer than mounting member 32 and is adapted to fit against opposite faces of the mounting member and enclose such therein.

Figure 3:
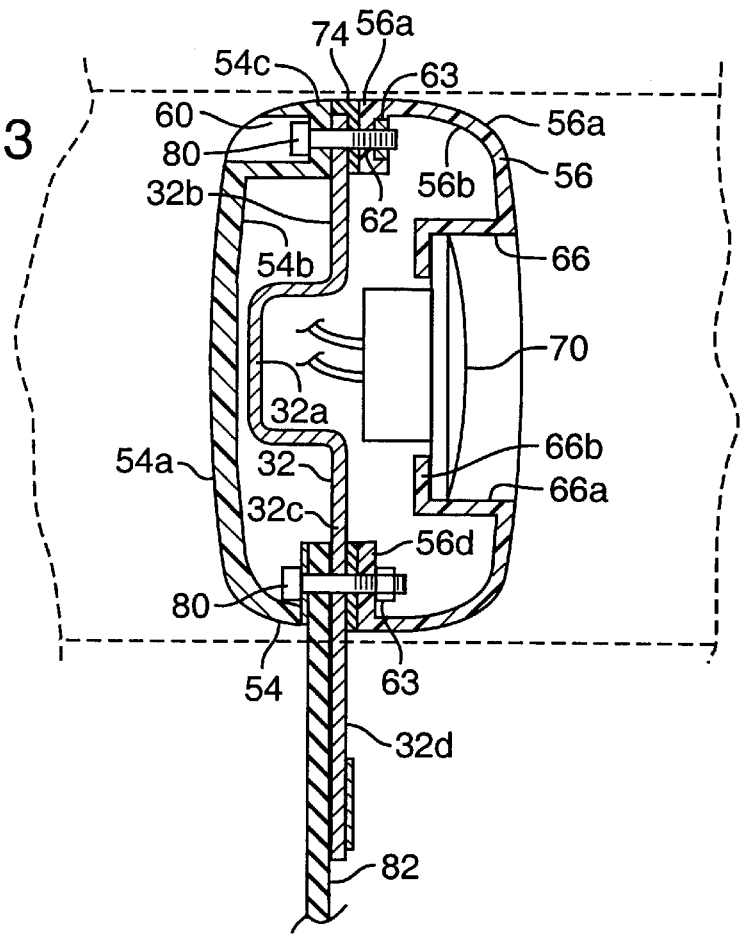
FIG. 3 is an enlarged cross-sectional view taken generally along the line of 3—3 in FIG. 1.

Referring first to the front bumper shell 54, it has an external, forwardly facing, convex curvilinear front surface, or face, 54a and an interior surface 54b defining a cavity within which a portion of mounting member 32 is received. The front bumper shell has a rearwardly facing marginal edge portion, or rim, having an upper section 54c, a lower section 54d and an end portion 54e, all facing rearwardly toward the mounting member. A plurality of bores 60 align generally with bores 34 in the mounting plate. Similarly, a series of bores in lower portion 54d align with bores 36 and/or 38 on the lower portion of the mounting member. As is best seen in FIG. 3 these bores may have recessed rims whereby screw heads may be recessed therein.

Rear bumper shell 56 also has a convexly curved exterior surface, or face, 56a and an interior surface 56b. The rear bumper shell has a forwardly facing marginal edge portion, or rim, having upper and lower sections 56c, 56d and an outer marginal rim portion 56e facing, and configured generally similarly, to rim margin portions 54c, 54d, 54e. Similarly, bores 62 are formed therein and have secured nuts 63 aligned therewith.

As is best seen in FIG. 2, the inner ends of shells 54, 56 nearest rail 12 have radially projecting rims 54f, 56f. When joined these define a somewhat rounded rectangular rim section, similar to the outline of the outer edge 44b of plate 44.

The rear bumper shell 56 has three apertures 64, 66, 68 formed therein. These are similar, and thus only aperture 66 illustrated in cross section in FIG. 3 will be discussed. The aperture is defined by a recessed rim 66a extending inwardly from the outer surface 56a. The rim has a inner end with a radially inwardly projecting lip 66b. This recess and lip are adapted to support a light, as illustrated at 70, which may be a vehicle light, such as a turn signal, brake light, or backup light. By being thus recessed the light is less subject to damage by external impact.

An elastomeric gasket 74 is positioned between the marginal rim edge portions of rear bumper shell 56 and bracket portions 32b, 32c of the mounting member. The gasket has bores 76 formed therein in a pattern matching the pattern of the bores 60 and 62 in the marginal rim portions of the front and rear bumper shells, and bores 34, 36, 38 in the mounting member.

Figure 4:
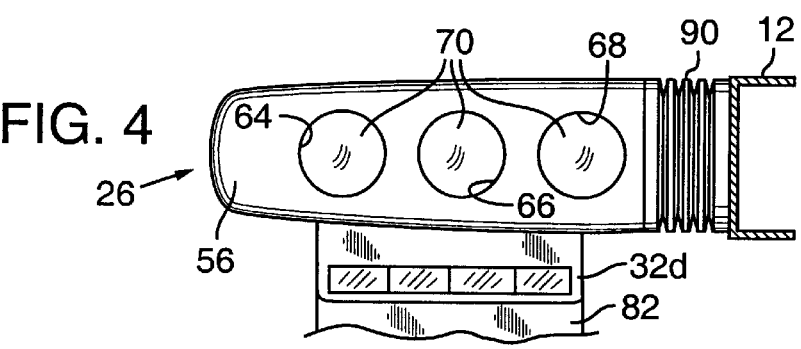
FIG. 4 is a rear view of the mounting assembly of FIG. 2.

As is best seen in FIGS. 3 and 4, depending portion 32d of the mounting member extends downwardly from the lower surface of the assembled bumper shells and is adapted to have a mudflap 82 secured, thereto. The mudflap has bores 83 formed therein in a pattern similar to the pattern of bores 36.

When assembled the front and rear bumper shells extend substantially parallel to the mounting member, and have a width contour projecting forwardly and rearwardly of the mounting member. The front bumper shell fits tightly against the front face of bracket portions 32b, 32c and mudflap 82. The forward side of gasket 74 fits against the rear face of bracket portions 32b, 32c and against the face of marginal rim portion 54e which is stepped out slightly from the surfaces of portions 54c, 54d. The forwardly facing surfaces of the marginal edge portions 56c, 56d, 56e of the rear bumper shell fit tightly against the rear side, or face surface, of gasket 74. Bolts, or screws, 80 extend through bores 34, 36, 38, 60, 62, 76, and 83 and are screwed into nuts 63 held in the marginal rim portions of rear bumper shell 56. Tightening of the screws draws the front and rear bumper shells into sealing engagement with the gasket, mudflap, and mounting member to form a substantially enclosed assembly having convex curvilinear forwardly and rearward surfaces to provide an aesthetically pleasing shape and aerodynamic outer surface contour for the assembly.

The bumper shells may be constructed of a vacuum formed or molded plastic, such as ABS or flexible urethane, or other suitable materials.

The assembly is mounted to a frame rail 12 by bolts (not shown) which extend through bores 44a in bracket 44 and bores 88 defined in frame rail 12.

A corrugated elastomeric boot 90, formed in a somewhat rounded rectangular cross sectional configuration, is interposed between one set of ends of the front and rear bumper shells and the frame rail to sealingly engage the inboard ends of the front and rear bumper shells and sealingly engage the frame rail to provide a flexible enclosure about the mounting assembly 42. One end 90a of the boot is stretched and fit tightly about projecting rims 54f, 56f on the bumper shells, while its opposite end 90b is stretched about and frictionally held on rim 44b of plate 44.

The assembled unit, mounted on a truck as illustrated in FIG. 1, is disposed in substantially horizontal, cantilevered position extending laterally outwardly from its associated frame rail rearwardly of a set of wheels 18. The flexible mounting assembly, or connector, 42 has sufficient rigidity that it will maintain the mounting unit in the position illustrated during normal use. However, should an added load or force, be imposed thereon, such as being impacted by another object, the flexible connector allows the assembly to pivot about a horizontal or vertical axis, or both, and then return the assembly to its original position upon removal of the loading.

The assembly provides an enclosed housing for lights which extends outwardly to the side of the frame rail away from the centerline for better visibility. It allows recessing and enclosure of the lights and their accompanying wires, and also provides an aerodynamic dirt and moisture resistant enclosure for the parts.

It should be recognized that the front bumper shell is substantially symmetrical about its horizontal centerplane, and the rear bumper shell is substantially symmetrical about its horizontal centerplane. They have generally the same curvature at their top as at their bottom, and thus may be used to form assembly parts for either the left hand bumper assembly 26 or the right hand bumper assembly 28. This can permit users or sellers to stock less parts.

Referring to FIG. 1, a bumper center section 100 is mounted between frame rails 12 and 14. This bumper center section is mounted on transverse beam 23 and extends transversely of the centerline of the vehicle between frame rails 12, 14.

The bumper center section may be formed in elongate forward and rearward shell sections which are joined to provide a substantially enclosed aerodynamic center section enclosure.

Figure 5:
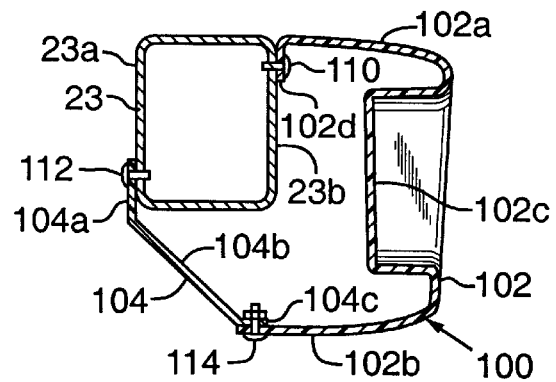
FIG. 5 is an enlarged cross-sectional view taken along line 5—5 in FIG. 1.

Referring to FIG. 5, beam 23 and center bumper section 100 are illustrated in cross-section. Beam 23 has front and rear upright faces 23a, 23b, respectively.

The bumper center section 100 has a rear shell section 102 and a front shell section 104. The rear shell section has a substantially horizontal upper portion 102a, a substantially horizontally disposed lower portion 102b, and a rearwardly facing portion with an indented region 102c, such as may be used to mount a license plate. Some convex rounding of the contours of the section provide aesthetic and aerodynamic features. The upper portion 102a, has a down-turned rim 102d, through which a fastener 110 extends to fasten the upper portion of shell 102, to the rear face 23b of the beam, with upper portion 102a aligned substantially horizontally with the top of beam 23.

Front shell section 104, has a substantially upright portion 104a, through which fasteners 112 extend to secure front shell 104 to the front of beam 23. Remainder portion 104b, extends downwardly and rearwardly at an angle relative to portion 104a, and has a substantially horizontally disposed portion 104c at its lower end. Fasteners, such as bolt and nut combinations 114, extend through a forward edge margin of 102b, and edge margin 104c, to provide a substantially enclosed interconnection between the lower portions of shells section 104, 102. Thus, a substantially enclosed, somewhat aerodynamically formed center bumper section is provided.

With this bumper center section provided in conjunction with mounting units 26, 28 a substantially continuous enclosed aerodynamic and aesthetically pleasing bumper assembly is provided extending across the full width of the rear of the truck.

The present invention provides an accessory mounting unit which may hold accessories such as lights, mudflaps, and other items which may be needed adjacent the rear of a truck, with such assembly being substantially enclosed against the infiltration of dirt, moisture, etc. Further it is contoured to provide convex curvilinear forward and rearward surfaces to provide an aerodynamic and pleasing combination.

I claim:

1. An accessory mounting unit for attachment adjacent the rear end of a truck having a longitudinal centerline and at least one longitudinally extending frame rail, the mounting unit comprising a substantially rigid elongate mounting member to be coupled at one of its ends to the frame rail and extend substantially horizontally and laterally outwardly therefrom away from the truck centerline, said mounting member having front and rear sides facing forwardly and rearwardly, respectively, of the truck when mounted, an elongate rear bumper shell removably attached to and extending substantially parallel to said mounting member and having a width contour projecting rearwardly therefrom, an elongate front bumper shell removably attached to and extending substantially parallel to said mounting member and having a width contour projecting forwardly therefrom, and a sealing interconnection between said front and rear bumper shells.

2. The mounting unit of claim 1, wherein said front and rear bumper shells have contiguous inboard ends adapted to be positioned adjacent the frame rail when installed, and which further comprises an elastomeric boot sealingly engaging the inboard ends of the front and rear bumper shells and to sealingly engage the frame rail when installed.

3. The mounting unit of claim 1, wherein said mounting member has an elongate support portion enclosed in said front and rear bumper shells and a depending portion extending downwardly therefrom to which depending portion a mudflap may be attached.

4. The mounting unit of claim 3, wherein said support portion comprises an elongate channel with attachment bracket portions extending upwardly and downwardly therefrom, and said front and rear bumper shells are attached to said bracket portions.

5. The mounting unit of claim 1, which further comprises a mounting assembly coupled to said one end of said mounting member and to be secured to the frame rail of the truck.

6. The mounting unit of claim 1, wherein said mounting assembly comprises a bracket to be attached to the frame rail, and a flexible coupling interconnecting the bracket and the mounting member, said flexible coupling having sufficient rigidity to support the assembly of the mounting member, front and rear bumper shells and an attached mudflap in a selected orientation during normal use, but to permit the assembly to move-out of said orientation upon a preselected load being imposed thereon and returning the assembly to said orientation when said load is removed.

7. The mounting unit of claim 6, wherein said flexible coupling comprises a spring permitting pivoting movement of said mounting member about both horizontal and vertical axes.

8. The mounting unit of claim 1, wherein said front and rear bumper shells are longer than said mounting member to provide an enclosure therefore and each has a convex curvilinear outer configuration to produce a combined assembly with aerodynamic front and rear configurations.

9. The mounting unit of claim 1, wherein said rear bumper shell has apertures formed therein adapted to receive vehicle lights.

10. The mounting of claim 9, wherein said rear bumper shell has a rearwardly facing outer surface and an aperture is defined by a recessed rim extending inwardly of said assembly from said outer surface, said rim having an inner end with a radially inwardly projecting lip to support a light in a recessed position in said aperture.

11. The mounting unit of claim 1, wherein said front and rear bumper shells have mating edge margins which are in adjacent facing relationship when assembled, and the sealing interconnection between the front and rear bumper shells comprises an elastomeric gasket pressed between said mating edge margins.

12. The mounting unit of claim 1, wherein said front bumper shell has a curvilinear forwardly facing outer configuration, said rear bumper shell has a convex curvilinear rearwardly facing outer configuration, and said front and rear bumper shells have marginal edge portions which are coupled closely adjacent each other when assembled to produce an enclosure assembly having a substantially aerodynamic outer shell configuration.

13. The mounting unit of claim 12, wherein said front and rear bumper shells have internal recesses which receive said mounting member therebetween and to receive and hold other components.

14. An accessory mounting unit for attachment adjacent the rear end of a truck having a longitudinal centerline and at least one longitudinally extending frame rail, the mounting unit comprising a substantially rigid elongate mounting member to be coupled at one of its ends to the frame rail and extend substantially horizontally and laterally outwardly therefrom away from the truck centerline, said mounting member having an elongate support portion with front and rear sides facing forwardly and rearwardly, respectively, of the truck when mounted, and a depending portion projecting downwardly from said support portion to which depending portion a mudflap may be attached, a mounting assembly coupled to said one end of the mounting member to secure the mounting member to the frame rail of the truck, an elongate rear bumper shell removably attached to and extending substantially parallel to said mounting member and having a width contour projecting rearwardly therefrom, an elongate front bumper shell removably attached to and extending substantially parallel to said mounting member and having a width contour projecting forwardly therefrom, and said front and rear bumper shells being longer than said support portion of the mounting member to provide an enclosure therefore with said depending portion extending below said bumper shells, and each bumper shell having a convex curvilinear outer configuration to produce a combined assembly with aerodynamic front and rear configurations.

15. The mounting unit of claim 14 which further comprises a sealing interconnection between the front and rear bumper shells.

16. The mounting unit of claim 14, wherein said front and rear bumper shells have contiguous inboard ends to be positioned adjacent the frame rail when installed, and which further comprises an elastomeric boot sealingly engaging the inboard ends of the front and rear bumper shells and to sealingly engage the frame rail when installed.

17. The mounting unit of claim 14, wherein said mounting assembly comprises a bracket to be attached to the frame rail, and a flexible spring coupling interconnecting the bracket and the mounting member permitting movement of said mounting member about both horizontal and vertical axes, said flexible coupling having sufficient rigidity to support the assembly of the mounting member, front and rear bumper shells and an attached mudflap in a selected orientation during normal use, but to permit the assembly to move out of said orientation upon a preselected load being imposed thereon and returning the assembly to said orientation when said load is removed.

18. The mounting of claim 17, wherein said front and rear bumper shells have contiguous inboard ends to be positioned adjacent the frame rail when installed, and which further comprises an elastomeric boot having a first end portion sealingly engaging the inboard ends of the front and rear bumper shells, an opposed second end to sealingly engage the frame rail when installed, and a flexible central portion enclosing said flexible coupling.

19. The mounting of claim 14, wherein said rear bumper shell has a rearwardly facing outer surface and an aperture is defined therein by a recessed rim extending inwardly of said assembly from said outer surface, said rim having an inner end with a radially inwardly projecting lip adapted to support a light in a recessed position in said aperture.

20. The mounting unit of claim 14 wherein said front and rear bumper shells have mating edge margins which are in adjacent facing relationship when assembled, and the sealing interconnection between the front and rear bumper shells comprises an elastomeric gasket disposed between said mating edge margins.

21. A truck having a longitudinal centerline and at least one longitudinally extending frame rail with an outer side facing laterally outwardly away from the centerline, and an accessory mounting unit attached to the frame rail adjacent the rear end of the truck, the mounting unit comprising a substantially rigid elongate mounting member coupled at one of its ends to the frame rail and extending substantially horizontally and laterally outwardly therefrom away from the truck centerline, said mounting member having front and rear sides facing forwardly and rearwardly, respectively, of the truck, an elongate rear bumper shell removably attached to and extending substantially parallel to said mounting member and having a width contour projecting rearwardly therefrom, an elongate front bumper shell removably attached to and extending substantially parallel to said mounting member and having a width contour projecting forwardly therefrom, and said front and rear bumper shells having a sealing interconnection therebetween.

22. The truck of claim 21, wherein said front and rear bumper shells have contiguous inboard ends positioned adjacent the frame rail, and which further comprises an elastomeric sealing boot sealingly engaging the inboard ends of the front and rear bumper shells and the frame rail.

23. The truck of claim 21, wherein said mounting member comprises an elongate support portion enclosed in said front and rear bumper shells and a depending portion extending downwardly therefrom to which depending portion a mudflap may be attached.

24. The truck of claim 21, wherein said mounting assembly comprises a bracket attached to the frame rail, and a flexible spring coupling interconnects the bracket and the mounting member permitting movement of said mounting member about both horizontal and vertical axes, said flexible coupling having sufficient rigidity to support the assembly of the mounting member, front and rear bumper shells and an attached mudflap in a selected orientation during normal use, but to permit the assembly to move out of said orientation upon a preselected load being imposed thereon and returning the assembly to said orientation when said load is removed.

25. The truck of claim 21, wherein said front and rear bumper shells have contiguous inboard ends positioned adjacent the frame rail, and which further comprises an elastomeric boot having a first end portion sealingly engaging the inboard ends of the front and rear bumper shells, an opposed second end sealingly engaging the frame rail, and a flexible central portion enclosing said flexible coupling.

26. The truck of claim 21, wherein said front and rear bumper shells are longer than said mounting member to provide an enclosure therefore and each has a convex curvilinear outer configuration to produce a combined assembly with aerodynamic front and rear configurations.

27. The truck of claim 21, wherein said rear bumper shell has a rearwardly facing outer surface and an aperture is defined therein by a recessed rim extending inwardly of said assembly from said outer surface, said rim having an inner end with a radially inwardly projecting lip to support a light in a recessed position in said aperture.

28. A truck having a longitudinal centerline and a pair of elongate laterally spaced longitudinally extending frame rails spaced to opposite sides of the centerline, each frame rail having an outer side facing away from the centerline, and a pair of right and left hand mirror image accessory mounting units, one of which mounting units is attached to one of the frame rails adjacent the rear end of the truck and extends laterally outwardly from the outer side of the one rail away from the centerline and the other of which mounting units is attached to the other of the frame rails adjacent the rear end of the truck and extends laterally outwardly from the outer side of said other rail away from the centerline, each mounting unit comprising a substantially rigid elongate mounting member coupled at one of its ends to its associated frame rail and extending substantially horizontally and laterally outwardly therefrom away from the truck centerline, said mounting member having front and rear sides facing forwardly and rearwardly, respectively, of the truck, an elongate rear bumper shell removably attached to and extending substantially parallel to said mounting member and having a width contour projecting rearwardly therefrom, an elongate front bumper shell removably attached to and extending substantially parallel to said mounting member and having a width contour projecting forwardly therefrom, and said front and rear bumper shells having a sealing interconnection therebetween.

29. The truck of claim 28, wherein said right and left hand mounting units are substantially aligned transversely adjacent the rear end of the truck, and which further comprises a center bumper section having a rear facing bumper shell extending between said frame rails and substantially aligned transversely with the right and left hand mounting units to define a substantially continuous rear bumper for the truck.

30. The truck of claim 29, wherein said center bumper section further comprises a front shell section coupled to said rear facing bumper shell, to provide a closure for a forwardly facing portion of the center bumper section.

\* \* \* \* \*